United States Patent
Sawai et al.

(10) Patent No.: US 6,196,946 B1
(45) Date of Patent: Mar. 6, 2001

(54) POWER ROLLER BEARING OF TOROIDAL TYPE CONTINUOUSLY VARIABLE TRANSMISSION AND METHOD OF MANUFACTURING POWER ROLLER BEARING OF TOROIDAL TYPE CONTINUOUSLY VARIABLE TRANSMISSION

(75) Inventors: Hiroyuki Sawai; Takafumi Kuwano; Nobuo Gotou; Takashi Imanishi; Nobuaki Mitamura, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/235,052

(22) Filed: Jan. 21, 1999

(30) Foreign Application Priority Data

Jan. 26, 1998 (JP) .................................................. 10-012689

(51) Int. Cl.[7] ............................. F16H 15/38; B21D 53/10
(52) U.S. Cl. ...................... 476/73; 29/898.066; 384/490; 384/492; 384/912; 476/40; 476/46
(58) Field of Search .................................. 476/40, 46, 73; 29/893.34, 898.066; 384/490, 492, 912

(56) References Cited

U.S. PATENT DOCUMENTS

| | | | |
|---|---|---|---|
| 1,366,026 | * | 1/1921 | Rydbeck ............................. 384/492 |
| 1,971,083 | * | 8/1934 | Schlaa .............................. 29/898.066 |
| 3,528,271 | * | 9/1970 | Di Ponio .......................... 29/898.066 |
| 3,867,751 | * | 2/1975 | Connell et al. ............. 29/898.066 X |
| 5,259,886 | * | 11/1993 | Utsumi et al. ........................ 148/318 |
| 5,261,159 | * | 11/1993 | Yasuda et al. ................... 29/898.066 |
| 5,340,221 | * | 8/1994 | Yasuda et al. ....................... 384/499 |
| 5,577,323 | * | 11/1996 | Sawai et al. .................... 29/898.066 |
| 5,580,328 | * | 12/1996 | Aramaki ................................ 476/40 |
| 5,976,053 | * | 11/1999 | Kino et al. ............................. 476/73 |

FOREIGN PATENT DOCUMENTS 9-126290   5/1997 (JP) .

* cited by examiner

Primary Examiner—Allan D. Herrmann
(74) Attorney, Agent, or Firm—Christensen O'Connor Johnson Kindness PLLC

(57) ABSTRACT

A power roller of a power roller bearing in a half-toroidal type continuously variable transmission is manufactured as follows. In step S1, a work used as material is heated up to a temperature suitable for forging. In step S2, the work is pressed by using a first die set, with its end face being held. In step S3, the work is forged by using a second die set. The work is formed into a work having a curved face corresponding to a traction surface, a hole corresponding to a center hole, and a recess corresponding to a raceway groove. In step S4, the work is punched by using a third die set. In step S5, the work is subjected to a cutting process and a heating process, thereby obtaining the power roller.

7 Claims, 10 Drawing Sheets

POWER ROLLER BEARING OF TOROIDAL TYPE CONTINUOUSLY VARIABLE TRANSMISSION AND METHOD OF MANUFACTURING POWER ROLLER BEARING OF TOROIDAL TYPE CONTINUOUSLY VARIABLE TRANSMISSION

BACKGROUND OF THE INVENTION

The present invention relates to a power roller bearing of a toroidal type continuously variable transmission and a method of manufacturing the power roller bearing of the toroidal type continuously variable transmission.

Speed change gears have mainly been used as conventional transmissions for vehicles such as automobiles. The speed change gears comprises a plurality of gears, and the engagement mode of the gears is varied to transmit torque from an input shaft to an output shaft. However, in the conventional speed change gears, torque is varied step-wise and discontinuously at the time of changing the speed. Thus, the speed change gears have drawbacks such as a loss in power transmission and vibration at the time of changing the speed.

Under the circumstances, a continuously variable transmission, in which torque is not varied stepwise or discontinuously at the time of changing the speed, has recently been put to practical use. In the continuously variable transmission, no vibration occurs at the time of changing the speed, and the loss in power transmission is less than that in the speed change gears. In addition, the continuously variable transmission is fuel-efficient when it is mounted in the vehicle. As an example of the continuously variable transmission, a belt type continuously variable transmission is mounted in some type of passenger cars.

On the other hand, as an another example of the continuously variable transmission, a toroidal type continuously variable transmission has been proposed. The toroidal type continuously variable transmission comprises an input shaft rotated by a drive source such as an engine, an input disk, an output disk, and a power roller bearing. The input disk is supported on the input shaft and rotated in interlock with the input shaft. The output disk is supported on the input shaft so as to be opposed to the input disk and is rotated in interlock with the output shaft.

A trunnion is provided between the input disk and the output disk so as to be rotatable about a rotational shaft. A displacement shaft is provided at a central portion of the trunnion. The power roller bearing is supported on the displacement shaft.

The power roller bearing comprises an outer race 62, as shown in FIG. 13B, which is supported on the displacement shaft of the trunnion, a power roller 61, as shown in FIG. 12B, which is rotatably supported on the displacement shaft, and balls serving as rolling elements rolling between the outer race and the power roller.

Both power roller 61 and outer race 62 have annular shapes. The power roller 61 and outer race 62 have raceway grooves 63 and 64 formed in their mutually opposed end faces. The raceway grooves 63 and 64 have annular shapes and arcuated cross sections. The balls roll along the raceway grooves.

The outer race 62 swings along with the trunnion. The power roller 61 has, as part of its peripheral surface, a traction face 65 put in rotational contact with the input disk and the output disk. In the power roller bearing, the outer race 62 swings along with the trunnion and the traction face 65 of power roller 61 is put in rotational contact with the input disk and output disk, so that a torque of the input shaft is transmitted to the output shaft with a desired acceleration ratio or deceleration ratio. The surface of raceway groove 63 and the traction face 63 of power roller 61 and the surface of raceway groove 64 of outer race 62 constitute raceway surfaces.

Compared to the aforementioned belt type continuously variable transmission, the toroidal type continuously variable transmission can transmit a higher torque. Thus, the toroidal type continuously variable transmission is regarded as efficient as continuously variable transmission for middle-sized and large-sized vehicles.

The toroidal type continuously variable transmission, however, is required to transmit a still higher torque. Accordingly, compared to general mechanical components such as gears and bearings, which receive repeated stress, the power roller 61 and outer race 62 of the power roller bearing suffer much greater repeated bending stress and repeated shearing stress.

The outer race 62 of the power roller bearing supports a thrust-directional load applied to the power roller 61 from the input disk and output disk. Consequently, the outer race 62 receives a very high stress at its raceway groove 64. Since the outer race 62 is supported on the displacement shaft, it receives a bending load due to the aforementioned thrust-directional load. A tensile stress due to the bending load acts on the outer race 62. In the state in which these stresses act on the outer race 62, the outer race 62 swings between the input disk and the output disk.

On the other hand, the power roller 61 transmits power from the input disk to the output disk in the state in which the traction face 65 is in rotational contact with the input disk and output disk and receives a great load from these disks. The power roller 61 thus swings repeatedly in the state in which a very high stress acts on the traction face 65 and raceway groove 63. In addition, a repeated tensile stress due to the above-mentioned high load acts on the raceway groove 63.

The power roller 61 and outer race 62 of the power roller bearing are required to have a long life, while a very high stress acts on the raceway surfaces such as the surfaces of raceway grooves 63 and 64 and the traction face 65.

In an example of a conventional method of manufacturing the power roller 61 and outer race 62 of the power roller bearing of the toroidal type continuously variable transmission, a rolled cylindrical solid material is cut and processed. Jpn. Pat. Appln. KOKAI Publication No. 9-126290 describes a method of manufacturing the power roller 61, wherein an annular material is cemented or carbonitrided and then forged.

If a metallic cylindrical material is cut and processed to obtain the power roller 61 and outer race 62, the yield of products decreases due to the cutting process and the time needed for processing increases. As a result, the manufacturing cost increases.

Besides, as shown in FIGS. 12A and 13A, a flow of metallic structure, so-called metal flow J, occurs along axis Ma and Mb at the time of rolling, etc. in cylindrical solid materials 60a and 60b which are formed as materials of the power roller 61 and outer race 62 through melting, forging and rolling steps.

If the power roller 61 and outer race 62 are formed by cutting and processing the materials 60a and 60b, the metal flow J occurs along axis Ma and Mb, as shown in FIGS. 12B and 13B.

Consequently, ends of metal flow, E1, E2 and E3, at which the metal flow ends, occur at the raceway surfaces, i.e. the surfaces of raceway grooves 63 and 64 and traction face 65.

If a stress, which is much higher than that on general mechanical components, acts on the raceway surfaces 63, 64 and 65, the power roller 61 and outer race 62 formed by the cutting process may easily be broken along the metal flow J. Accordingly, the life of the power roller 61 and outer race 62 formed by the cutting process is generally short. Thus the life of the toroidal type continuously variable transmission including these power roller 61 and outer race 62 is also short.

In the aforementioned method described in Jpn. Pat. Appln. KOKAI Publication No. 9-126290, the annular material with a metal flow extending along its axis is used. This material is cemented or carbonitrided and then forged along its axis. The material is then expanded toward its periphery into a shape corresponding to the power roller. At last, the material is cut and processed to obtain the power roller.

The power roller formed by this method, like the power roller 61 and outer race 62 formed by the above-described cutting process, has ends of metal flow at the raceway surfaces such as the raceway groove and traction face. Accordingly, the power roller manufactured by the method described in Jpn. Pat. Appln. KOKAI Publication No. 9-126290 has a short life in general. Thus the toroidal type continuously variably transmission including this power roller has a short life, too.

BRIEF SUMMARY OF THE INVENTION

The object of the present invention, therefore, is to provide a power roller bearing of a toroidal type continuously variable transmission, which has a long life, and a method of manufacturing the power roller bearing of the toroidal type continuously variable transmission, which has a long life and can prevent an increase in manufacturing cost.

In order to achieve the object, the present invention provides a power roller bearing in a toroidal type continuously variable transmission for transmitting power due to rotation of an input disk to an output disk, the power roller bearing being provided swingably between the input disk and the output disk, the power roller bearing comprising:

an inner race; and an outer race, wherein the inner race is formed in an annular shape and includes a traction surface put in contact with both the input disk and the output disk, an end face opposed to the outer race, and an annular raceway groove provided at the end face, and a metal flow extending along at least one of the traction surface and a surface of the raceway groove, and the outer race is formed in an annular shape and includes an end face opposed to the inner race and an annular raceway groove provided at the end face, and a metal flow extending along a surface of the raceway groove.

In the present invention, it is defined that the metal flows having angles of 20 degrees to 30 degrees at most to tangent lines to the surfaces of the raceway grooves of the inner race and outer race and the traction surface extend along the surfaces of the raceway grooves and traction surface.

The inner race of the power roller bearing has a metal flow extending along at least one of the traction surface and the surface of the raceway groove. Thus, an end of metal flow does not easily occur at the raceway surfaces of the inner race, such as the traction surface and the surface of the raceway groove.

The outer race of the power roller bearing has a metal flow extending along the surface of the raceway groove. Thus, an end of metal flow does not easily occur at the raceway surface of the outer race, such as the surface of the raceway groove.

Since an end of metal flow does not easily occur at the raceway grooves of the inner race and outer race, the raceway grooves are not easily destroyed even if a high stress acts thereon. The life of the power roller bearing having these inner race and outer race is increased.

It is preferable that in the power roller bearing, on at least one of the surfaces of the raceway groove of the inner race and the raceway groove of the outer race, an end of the metal flow is formed at a position other than a position where a ratio of a distance from a bottom of the raceway groove to a distance between the bottom and one of an inner peripheral end and an outer peripheral end of the raceway groove is less than 70%.

In this power roller bearing, no end of metal flow occurs at the surface of at least one of the raceway grooves of the inner race and outer race in the range of less 70% of the width of the raceway groove near the center of the raceway groove. Thus, the inner race and outer race are prevented from being destroyed at the surfaces of the raceway grooves. Therefore, A life of the power roller bearing including the inner race and outer race is elongated.

It is preferable that in the power roller bearing, the inner race and outer race have center holes, and on an inner peripheral surface defining at least one of the center holes of the inner race and the outer race, an end of a metal flow is formed at a position other than a position where a ratio h/H of a distance h from the end face to a thickness H of an associated one of the inner race and the outer race is less than 30%.

In this power roller bearing, accordingly, the inner race and outer race are prevented from being destroyed at the inner peripheral face of the center hole. A life of the power roller bearing including the inner race and outer race is elongated.

In order to achieve the above object, there is provided a method of manufacturing a power roller bearing in a toroidal type continuously variable transmission including an inner race and an outer race, wherein the inner race and the outer race have annular shapes and include mutually opposed end faces, raceway grooves provided at the end faces, center holes provided at central portions thereof, and metal flows extending along the raceway grooves, and at least one of the inner race and the outer race is formed by using as a material a cylindrical work having a metal flow extending along an axis, and is manufactured through:

an upsetting step for pressing the work along the axis;

a forging step for forging the upset work, thereby forming a recess corresponding to the raceway groove and a hole having a bottom and corresponding to the center hole; and a punching step for punching the forged work, thereby removing a part of the work constituting the bottom of the hole.

In this manufacturing method, the inner race and outer race are formed mainly by the forging process such as upsetting and die forging. Thus, the yield of materials can be enhanced and the increase in manufacturing cost of the power roller bearing can be prevented.

According to this manufacturing method, at least one of the inner race and outer race is manufactured through three steps: an upsetting step, a forging step and a punching step. Thus, the flow of the metallic structure of the work, in particular, in the mold-forging step can be smoothly controlled. The inner race and outer race having the well-balanced metal flows can be obtained. Therefore, the power roller bearing with a long life can be manufactured.

It is preferable that in the upsetting step, when the work is pressed, a first die set is used, the first die set comprising:

a first die having an end face extending perpendicular to the axis of the work; and a second die having an end face extending perpendicular to the axis of the work.

It is more preferable that the first die set has, at least at one of the end face of the first die and the end face of the second die, a recessed portion having a diameter greater than an outside diameter of the work and less than a diameter of one of inner peripheral ends of the raceway groove, the recessed portion being recessed from the end face.

According to the manufacturing method using the first mold set, in the upsetting step, the work is pressed in the state in which the recessed portion holds one end face of the work. Thus, the metal flow of the work can be formed along the recess corresponding to the raceway groove. An end of metal flow does not easily occur at the surface of the raceway grooves of the inner race and outer race. The inner race and outer race are prevented from being destroyed at the surfaces of the raceway grooves. Therefore, the power roller bearing with a relatively long life can be obtained.

It is preferable that in the forging step, when the upset work is forged, a second die set is used, the second die set comprising:

a third die having a first mold cavity with an inside diameter greater than an outside diameter of the work; and a fourth die formed cylindrical with an outside diameter substantially equal to the inside diameter of the first mold cavity, and having an end face extending perpendicular to the axis of the work, a central projection projecting from the end face toward the work and having a diameter smaller than an inside diameter of the center hole, and a peripheral projection projecting from the end face toward the work and formed annularly along the raceway groove with an arcuated cross section.

It is preferable that in the punching step, when the forged work is punched, a third die set is used, the third die set comprising:

a fifth die having an inside diameter equal to an outside diameter of the work, a second mold cavity with a bottom surface, and a punching hole extending along the axis of the work, opening at the bottom surface, and having an inside diameter slightly less than an inside diameter of the center hole; and a sixth die formed cylindrical and having an end face extending perpendicular to the axis of the work and an outside diameter slightly less than the inside diameter of the center hole.

According to these manufacturing methods, in the mold-forging step, the central projection and the peripheral projection form in the work the hole corresponding to the center hole and the recess corresponding to the raceway groove. In the punching step, a part of the work, which constitutes the bottom of the center hole, is removed.

Accordingly, the metal flow of the work extends along the surface of the recess corresponding to the raceway groove. Thus, an end of metal flow does not easily occur at the surfaces of the raceway grooves, and the life of the inner race and outer race is increased. The life of the power roller bearing is also increased.

In addition, an end of metal flow does not easily occur at the inner peripheral surface of the hole in the work, which corresponds to the center hole, in the vicinity of the end face having the recess corresponding to the raceway groove. Moreover, most of the part containing a great deal of impurities at the central region of the pre-processed work is removed. Accordingly, the life of the inner race and outer race is increased, and the life of the power roller bearing is also increased.

It is desirable that the work have a ratio of its length L to its outside diameter $D0$, which meets the following relationship:

$$L/D0 \leq 2.2$$

In this case, in the upsetting step, the work can be pressed while one end face of the work is exactly held.

It is also preferable that in the second die set for forging the work used as the material of the inner race, the third die includes a traction forming surface formed to match with a traction surface.

In this case, the metal flow of the work for the inner race can be formed along the traction surface. Thus, an end of metal flow does not easily occur at the traction surface of the inner race. The inner race is prevented from being destroyed at the traction surface. The inner race with a long life can be obtained. Therefore, the power roller with a long life can be manufactured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
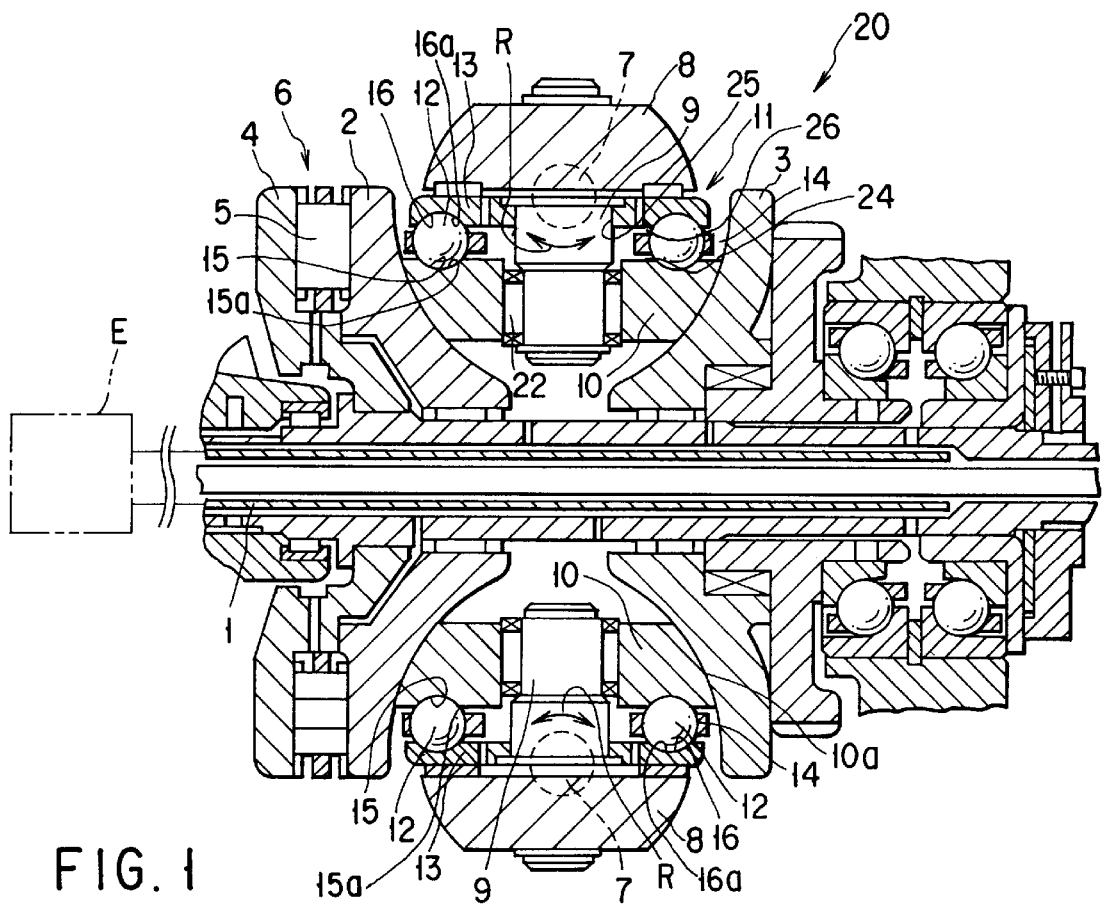
FIG. 1 is a vertical cross-sectional view showing a part of a half-toroidal type continuously variable transmission according to an embodiment of the present invention.

FIG. 1 is a vertical cross-sectional view showing a part of a half-toroidal type continuously variable transmission 20 as an example of a toroidal type continuously variable transmission. The half-toroidal type continuously variable transmission 20 is an apparatus for transmitting to an output shaft a power produced by rotation of an input shaft 1 coupled to a drive source E including an engine.

As is shown in FIG. 1, the half-toroidal type continuously variable transmission 20 comprises the input shaft 1 rotated by the drive source E including the engine, an input disk 2, an output disk 3, a compression device 6 and a power roller bearing 11.

The input disk 2 is splined to the input shaft 1 and rotates along with the input shaft 1. The output shaft 3 is supported on the input shaft 1 so as to be opposed to the input disk 2. The output disk 3 is rotatably supported on the input shaft 1. The output disk 3 rotates in interlock with an output shaft which derives power from the torque of the input shaft 1.

The compression device 6 is provided on the rear side of the input disk 2. The compression device 6 comprises a cam disk 4 and a cam roller 5 provided on the rear side of the input disk 2. The cam disk 4 is splined to the input shaft 1 and rotates along with the input shaft 1. The cam roller 5 is provided between the cam disk 4 and input disk 2. In the compression device 6, the cam roller 5 is rotated to urge the input disk 2 towards the output disk 3.

A trunnion 8 is provided between the input disk 2 and output disk 3. The trunnion 8 can swing on a rotational shaft 7 in the direction of a double-headed arrow R in FIG. 1, the rotational shaft 7 extending perpendicular to an axis P of the input shaft 1. A displacement shaft 9 extending perpendicular to the rotational shaft 7 is provided at a central portion of the trunnion 8.

The power roller bearing 11 is supported on the displacement shaft 9. The power roller bearing 11 comprises an outer race 13, a power roller 10 serving as an inner race, and balls 12 serving as rolling elements. The outer race 13 is supported on the trunnion 8. The power roller 10 is rotatably supported on the displacement shaft 9 of the trunnion 8. The power roller 10 is supported between the input disk 2 and output disk 3 so as to be freely inclined by the trunnion 8. The power roller 10 is put in rotational contact with both input disk 2 and output disk 3. The balls 12 are provided between the power roller 10 and outer race 13 so as to freely roll therebetween.

Figure 2A:
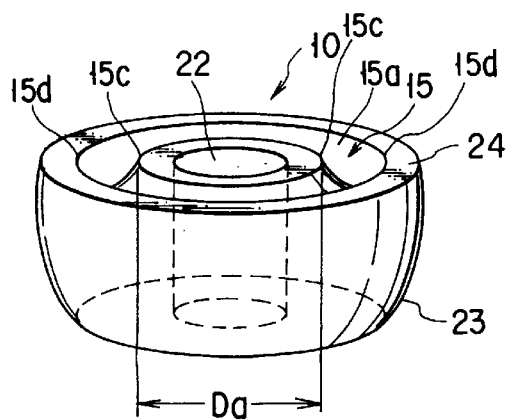
FIG. 2A is a perspective view showing a power roller of the half-toroidal type continuously variable transmission shown in FIG. 1.

As is shown in FIG. 2A, the power roller 10 is formed in an annular shape and has a center hole 22 as a center through hole at its central portion. The power roller 10 is supported in the state in which the displacement shaft 9 is inserted in the center hole 22. The power roller 10 is rotatably fitted on the displacement shaft 9.

The power roller 10 has a traction surface 23 as part of its outer peripheral surface. The traction surface 23 is put in rotational contact with both the input disk 2 and output disk 3. The traction surface 23 has an arcuated shape defined about the rotational shaft 7 in the state in which the displacement shaft 9 is supported on the power roller 10.

The power roller 10 has a raceway groove 15 at its end face 24. The raceway groove 15 has an annular shape and an arcuated cross section. The raceway groove 15 is coaxial with the displacement shaft 9 and center hole 22. In the state in which the power roller 10 is supported on the displacement shaft 9, the end face 24 is opposed to the outer race 13 and located on the outside of the transmission 20.

Figure 2B:
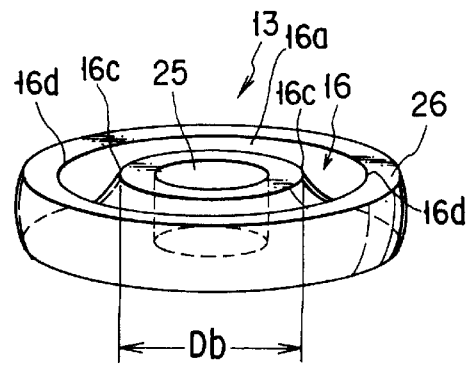
FIG. 2B is a perspective view showing an outer race of the power roller bearing of the half-toroidal type continuously variable transmission shown in FIG. 1.

As is shown in FIG. 2B, the outer race 13 has an annular shape and a center hole 25 as a center through hole at its central portion. The outer race 13 is supported in the state in which the displacement shaft 9 is inserted in the center hole 25. The outer race 13 is situated between the trunnion 8 and power roller 10, as shown in FIG. 1.

The outer race 13 has a raceway groove 16 at its end face 26. The raceway groove 16 has an annular shape and an arcuated cross section. The raceway groove 16 is coaxial with the displacement shaft 9 and center hole 25. In the state in which the outer race 13 is supported on the displacement shaft 9, the end face 26 is opposed to the power roller 10 and located on the inside of the transmission 20. The surface 15a of the raceway groove 15 of power roller 10, the traction face 23 of power roller 10, and the surface 16a of the raceway groove 16 of outer race 13 constitute raceway surfaces.

A plurality of balls 12 are provided between the power roller 10 and outer race 13. The balls 12 roll within the raceway grooves 15 and 16. The balls 12 are retained between the power roller 10 and outer race 13 by means of an annular retainer 14.

With the above structure, the power roller bearing 11 transmits a rotational force of the input disk 2 to the output disk 3, while receiving a thrust-directional load applied by the input disk 2 and output disk 3 and permitting rotation of the power roller 10.

The above-described power roller 10 is manufactured through a first upsetting step, a first die forging step and a first punching step. These steps will now be described.

Figure 4A:
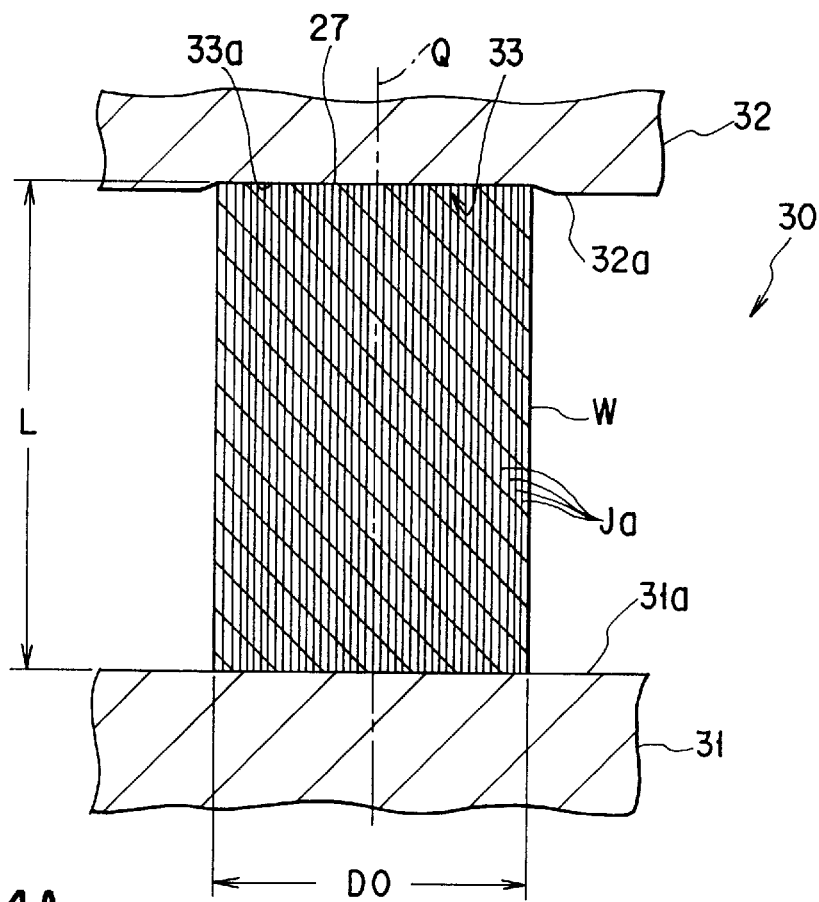
FIG. 4A is a cross-sectional view showing a first work and a first die set before a first upsetting step for manufacturing the power roller shown in FIG. 2A.
Figure 4B:
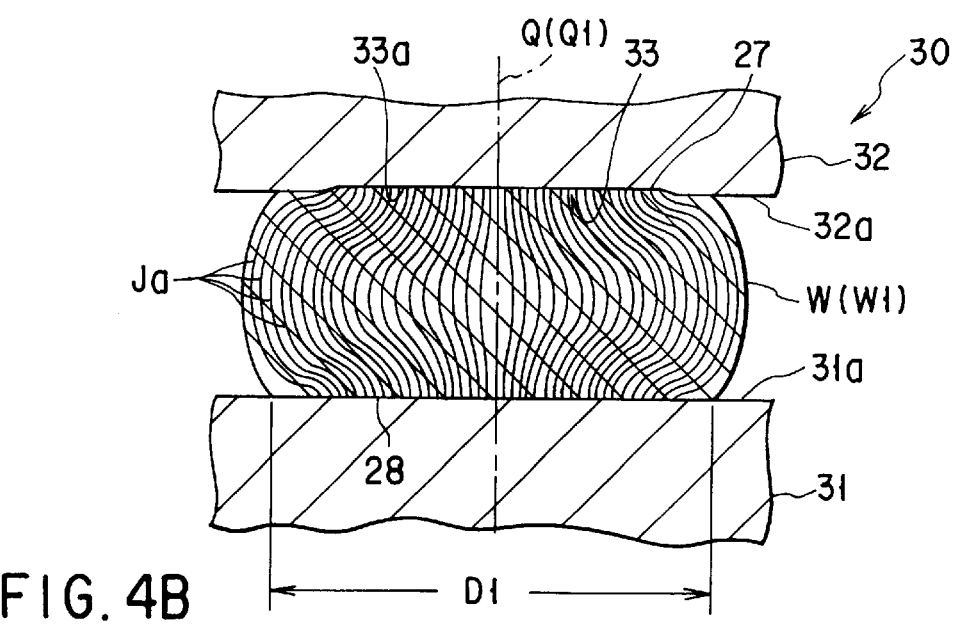
FIG. 4B is a cross-sectional view showing the first work and the first die set after the first upsetting step for manufacturing the power roller shown in FIG. 2A.

As is shown in FIGS. 4A and 4B, a first die set 30 used in the first upsetting step comprises a first die 31 and a second die 32. The first die 31 and second die 32 press a rod-like metallic material W (hereinafter referred to as "first work") from its both sides along an axis Q of the first work W.

The first work W is formed by a rolling step, etc. to be solid in a cylindrical shape, with its outside diameter being substantially constant along the axis Q. The first work W has an internal metal flow Ja extending along the axis Q, as shown in FIG. 4A.

The first work W has a ratio of length L to outside diameter D0, which meets the following equation 1. The first work W is a cylindrical solid body having an outside diameter D0 smaller than a diameter Da of an inner peripheral end 15c of the raceway groove 15 of the power roller 10 shown in FIG. 2A.

$$L/D0 \leq 2.2 \tag{1}$$

The first die 31 has a flat end face 31a which is put in contact with the first work W when the first work W is to be pressed. When the first work W is placed, the end face 31a extends perpendicular to the axis Q of the first work W.

The second die 32 has a flat end face 32a which is put in contact with the first work W when the first work W is to be pressed. The end face 32a is provided with a recessed portion 33 corresponding to the outer shape of first work W.

The recessed portion 33 retreats from the end face 32a. The recessed portion 33 has a flat bottom surface 33a. The bottom surface 33a extends perpendicular to the axis Q of first work W placed on the first die 31. The inside diameter of the recessed portion 33 is equal to the outside diameter D0 of first work W.

One end face 27 of first work W is fitted in the recessed portion 33. The recessed portion 33 holds the first work W such that its axis Q is perpendicular to the end face 32a. When the first work W is pressed, the recessed portion 33 holds the first work W so that the end of metal flow Ja at the end face 27 may not spread radially outward. The diameter of the recessed portion 33, like the outside diameter of first work W, is less than the diameter Da of the inner peripheral end 15c of the raceway groove 15.

In FIGS. 4A and 4B, the recessed portion 33 is provided at the end face 32a of second die 32. However, the recessed portion 33 may be provided at the end face 31a of first die 31, when the dies 31 and 32 are formed. The recessed portion 33 may be provided at least at one of the end face 31a of first die 31 and the end face 32a of second die 32.

Figure 5A:
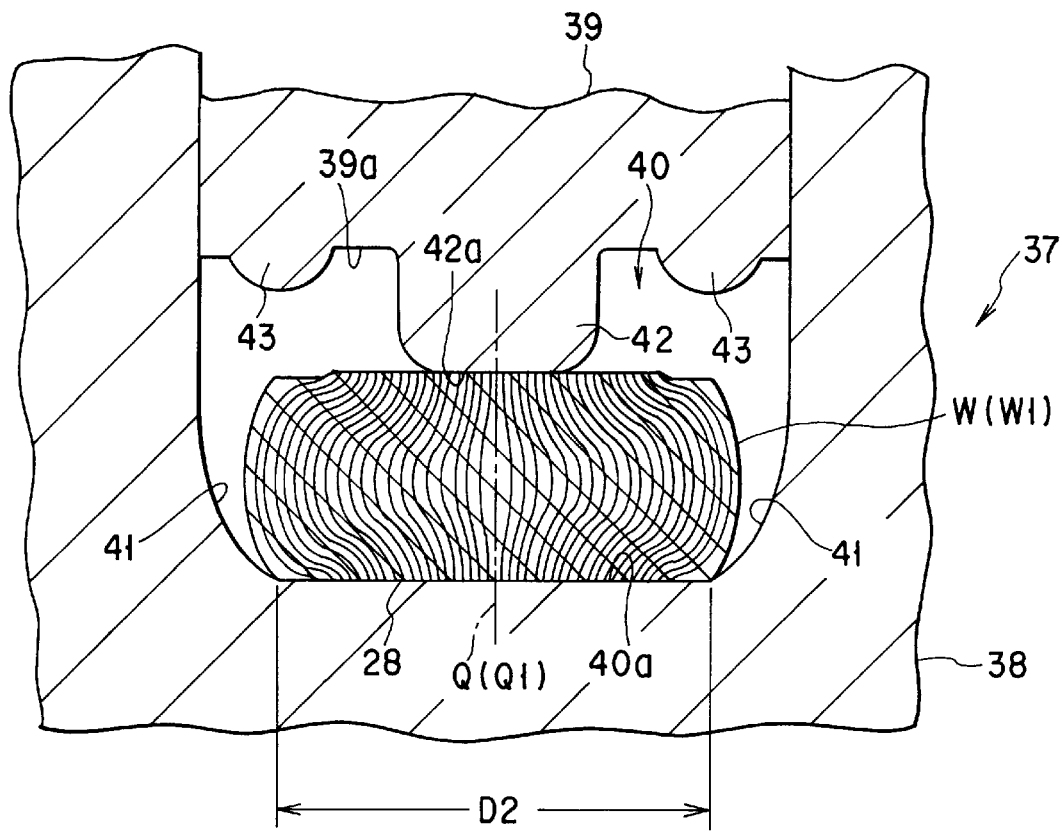
FIG. 5A is a cross-sectional view showing the first work and a second die set before a first die forging step for manufacturing the power roller shown in FIG. 2A.
Figure 5B:
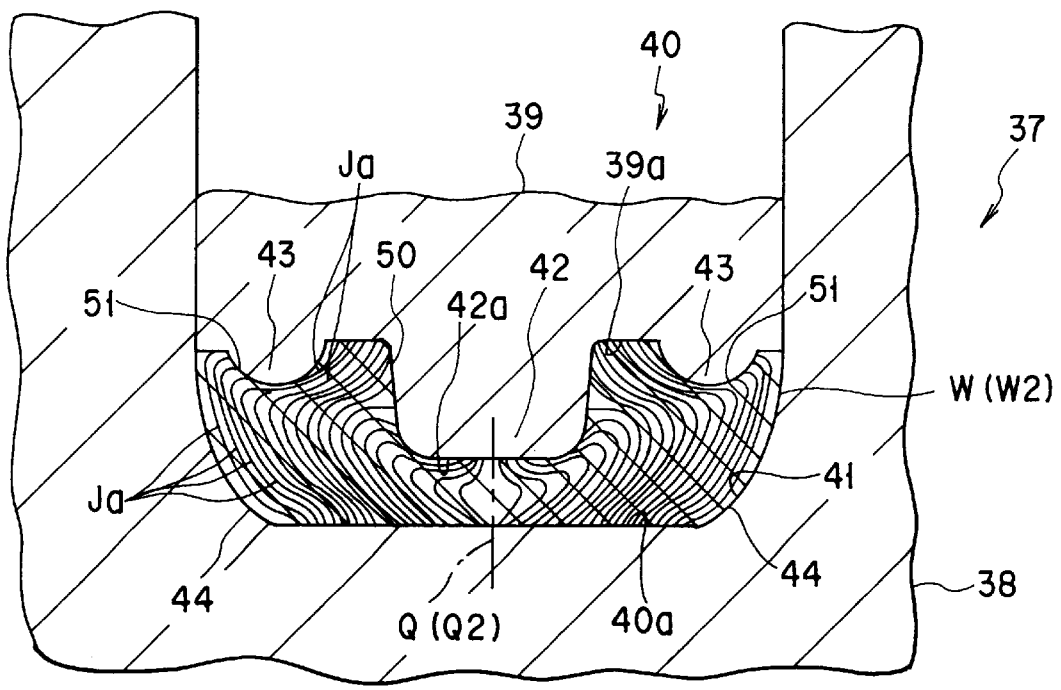
FIG. 5B is a cross-sectional view showing the first work and the second die set after the first die forging step for manufacturing the power roller shown in FIG. 2A.

As is shown in FIGS. 5A and 5B, a second die set 37 used in the first die forging step comprises a third die 38 and a fourth die 39.

The third die 38 integrally has a first mold cavity 40. The first mold cavity 40 has a bottom face 40a. The first mold cavity 40 is defined along the axis Q (Q1) of the first work W (W1). The first mold cavity 40 has a cylindrical shape, with its inside diameter being substantially constant along the axis Q(Q1). The first mold cavity 40 has an inside diameter slightly greater than the outside diameter of the first work W (W1) subjected to the first upsetting step.

The bottom face 40a of first mold cavity 40 has a diameter D2 equal to the outside diameter D1 of a bottom surface 28 of the first work W (W1) subjected to the first upsetting step. The bottom face 40a of first mold cavity 40 is flat and extends perpendicular to the axis Q (Q1) of the work. The bottom surface 28 of first work W (W1) is the surface which was put in contact with the end face 31a in the first upsetting step.

The inside diameter of the first mold cavity 40 gradually increases away from the bottom face 40a. The first mold cavity 40 includes a traction formation surface 41. The traction formation surface 41 is formed to have an arcuated cross section in accordance with the outer shape of the traction surface 23 of the power roller 10.

The fourth die 39 has a cylindrical shape. The fourth die 39 has an outside diameter substantially equal to the inside diameter of the first mold cavity 40. The fourth die 39 has a flat end face 39a which is opposed to the first work W (W1). The end face 39a of fourth die 39 extends perpendicular to the axis Q (Q1) of first work W (W1).

The fourth die 39 integrally has a central projection 42 and a peripheral projection 43 at its end face 39a. The central projection 42 is provided at the center of the end face 39a. The central projection 4 projects from the end face 39a toward the first work W (W1). The central projection 42 has a flat end face 42a extending in parallel to the end face 39a. The end face 42a is to come in contact with the first work W (W1). The end face 42a of central projection 42 has a circular shape with a diameter slightly less than the inside diameter of the center hole 22.

The peripheral projection 43 is formed at the end face 39a in the circumferential direction around the central projection 42. The peripheral projection 43 projects from the end face 39a toward the first work W (W1). The peripheral projection 43 extends annularly and has an arcuated cross section. The peripheral projection 43 extends along the raceway groove 15 of power roller 10.

Figure 6A:
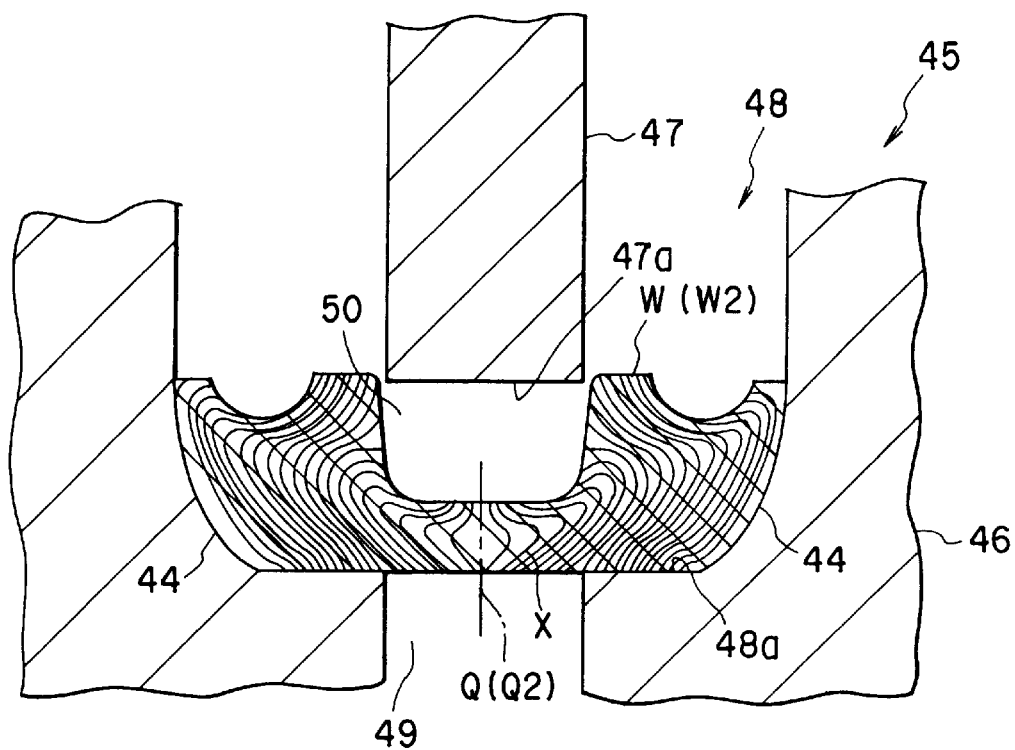
FIG. 6A is a cross-sectional view showing the first work and a third die set before a first punching step for manufacturing the power roller shown in FIG. 2A.
Figure 6B:
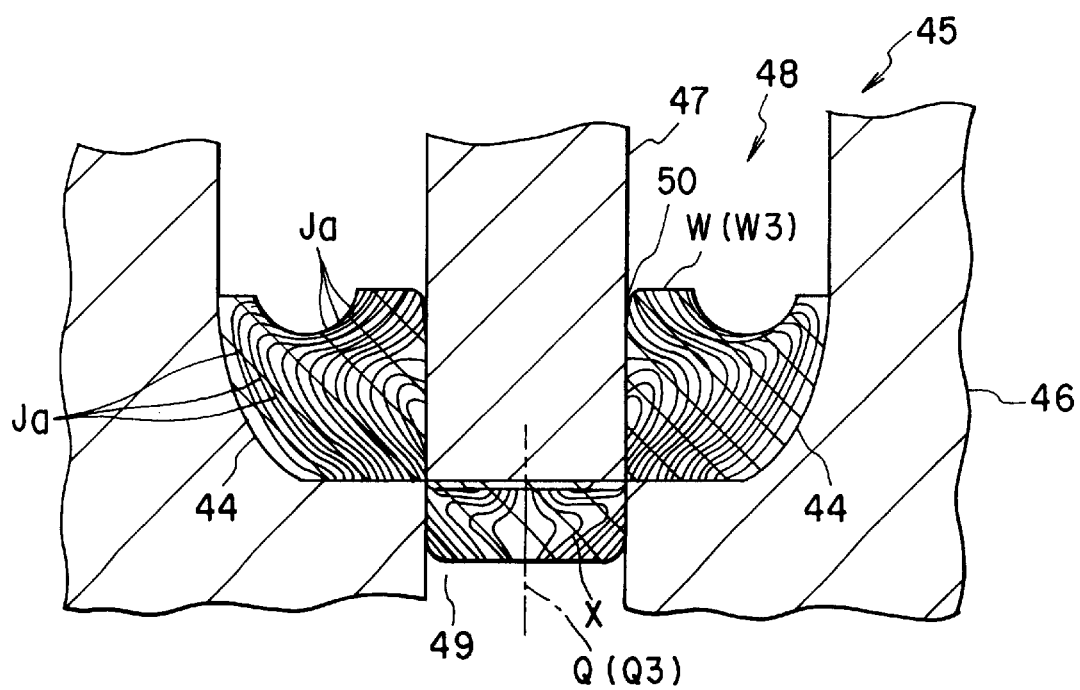
FIG. 6B is a cross-sectional view showing the first work and the third die set after the first punching step for manufacturing the power roller shown in FIG. 2A.

As is shown in FIGS. 6A and 6B, a third die set 45 used in the first punching step following the first forging step comprises a fifth die 46 and a six die 47.

The fifth die 46 has a second mold cavity 48 with the same shape as the first mold cavity 40 of third die 38. The second mold cavity 48 includes a bottom surface 48a and a punching hole 49 made in the center of the bottom surface 48a.

The punching hole 49 penetrates the fifth die 46 along the axis Q (Q2) of the first work W (W2) placed on the bottom surface 48a of second mold cavity 48. The punching hole 49 has a cylindrical shape. The inside diameter of the punching hole 49 is slightly greater than the outside diameter of the central projection 42. The punching hole 49 has an inside diameter slightly less than the inside diameter of the center hole 22.

The sixth die 47 has a flat end face 47a opposed to the first work W (W2). The sixth die 47 has an end face 47a extending perpendicular to the axis Q (Q2) of the first work W (W2). The sixth die 47 has a cylindrical shape, extending along the axis Q (Q2). The outside diameter of the sixth die 47 is equal to that of the central projection 42.

The process of manufacturing the power roller 10 will now be described with reference to FIGS. 3A, 4A through 6B and 10. In step S1 in FIG. 3A, the first work W, which meets the equation (1) and has the outside diameter D0 smaller than the diameter Da of the inner peripheral end 15c of the raceway groove 15, is heated by a well-known heating device such as an electric furnace up to such a temperature for forging as to permit easy deformation.

In step S2 in FIG. 3A, the first upsetting step is performed, as described below. In the first upsetting step, as shown in FIG. 4A, the first work W is placed on the end face 31a of first die 31. The first die 31 and second die 32 are moved toward each other and the first work W is positioned such that one end face 27 of first work W is fitted in the recessed portion 33.

The dies 31 and 32 are further moved toward each other along the axis Q and thus the first work W is pressed. The first work W (W1) is formed in a disk-like shape, with the outside diameter being increased along the end face 31a of first die 31 and the end face 32a of second die 32.

In this case, the first work W (W1) is pressed in the state in which its end face 27 is held by the recessed portion 33. Accordingly, the metal flow Ja of the end face 27 of first work W (W1) does not spread radially outward after the pressing. On the other hand, the metal flow Ja of the region other than the end face 27 spreads radially outward of the first work W (W1) after the pressing.

It is preferable in the first upsetting step that the outside diameter D1 of the bottom surface 28 shown in FIG. 4B becomes equal to the diameter D2 of the bottom face 40a of first mold cavity 40 shown in FIG. 5A.

Figures 3A, 3B:
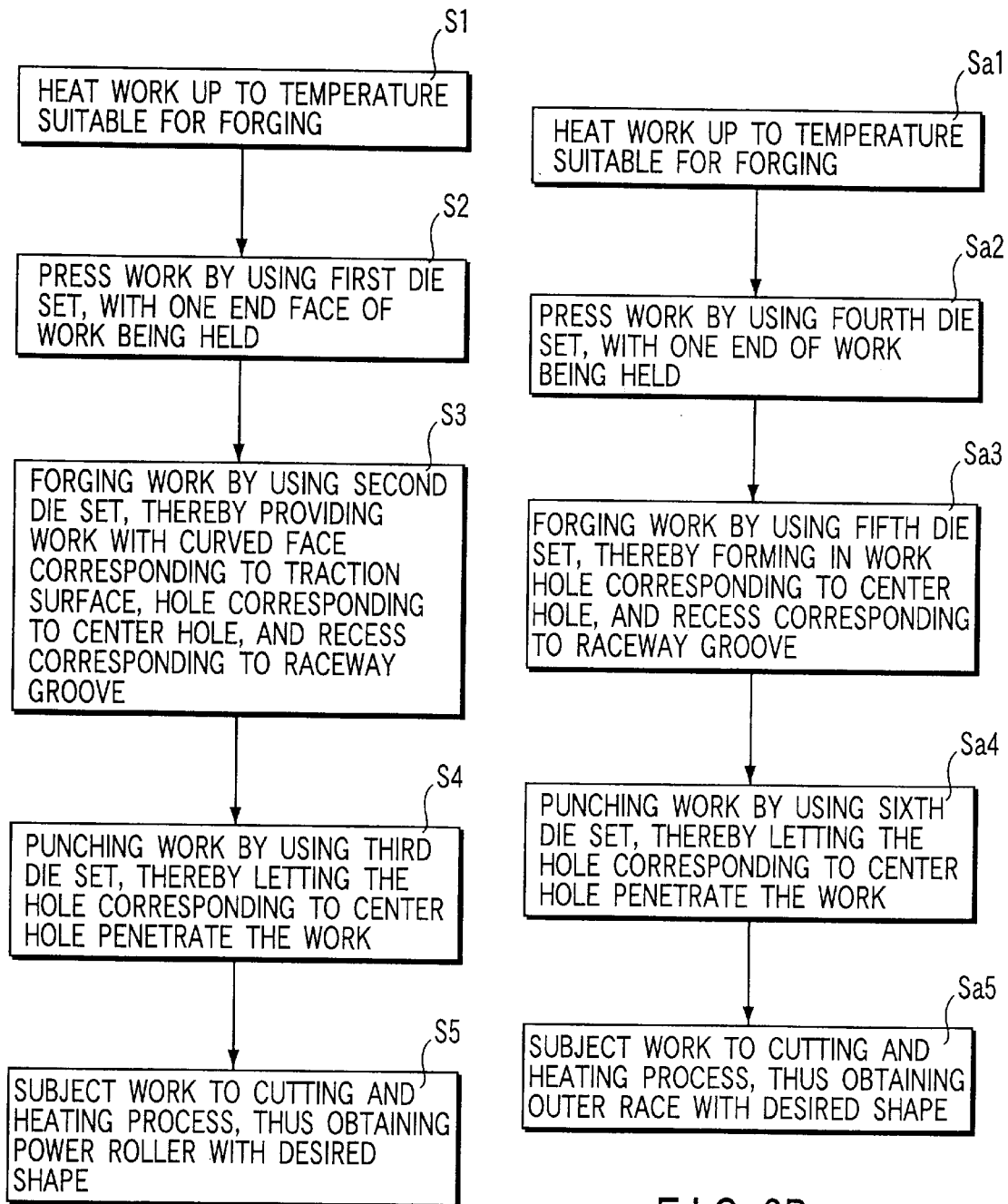
FIG. 3A is a flow chart showing an example of a process of manufacturing the power roller shown in FIG. 2A.
FIG. 3B is a flow chart showing an example of a process of manufacturing the outer race shown in FIG. 2B.

Following the first upsetting step, the first forging step is performed in step S3 in FIG. 3A. In the first forging step, the first work W (W1) is placed on the bottom face 40a of the first mold cavity 40 in third die 38 of second die set 37.

In the first upsetting step, the outside diameter D1 of the bottom surface 28 of first work W (W1) is made substantially equal to the diameter D2 of the bottom face 40a of first mold cavity 40. Thus, the first work W (W1) is positioned to be coaxial with the first mold cavity 40 and the axis Q (Q1) is made perpendicular to the bottom face 40a.

The fourth die 39 is inserted into the first mold cavity 40 such that the central projection 42 and peripheral projection 43 are opposed to the first work W (W1). The dies 38 and 39 are moved toward each other along the axis Q (Q1) so that the bottom face 40a and end face 39a may approach each other. Thus the first work W (W1) is forged.

As a result, as shown in FIG. 5B, the first work W (W2) is formed to have a shape corresponding to the bottom face 40a of first mold cavity 40, the traction forming surface 41, the central projection 42 and the peripheral projection 43.

In this case, the first work W (W2) is integrally provided with a curved face 44 corresponding to the traction surface 23, which is formed along the traction forming surface 41, a hole 50 corresponding to the center hole 22, which is formed to match with the central projection 42, and a recess 51 corresponding to the raceway groove 15, which is formed to match with the peripheral projection 43. The hole 50 corresponding to the center hole 22, which is formed in this step, does not penetrate the first work W (W2).

In the first upsetting step, the first work W (W2) is held so that the metal flow Ja at the end face 27 may not spread radially outward, and the diameter of the recessed portion 33 holding the end face 27 is made less than the inside diameter Da of the inner peripheral end 15c of the raceway groove 15. Accordingly, no end of metal flow Ja, at which the metal flow Ja disrupts, occurs at the surface of the recess 51 corresponding to the raceway groove 15, which is formed along the peripheral projection 43. The metal flow Ja extends along the recess 51 corresponding to the raceway groove 15.

In the first upsetting step, the metal flow Ja at the region of the first work W (W2), other than the end face 27, spreads radially outward. Thus, the metal flow Ja extends along the traction forming surface 41. Accordingly, no end of metal flow Ja occurs at the curved face 44 corresponding to the traction surface 23. The metal flow Ja forms along the traction surface 23.

Following the first forging step, the first punching step is performed in step S4 in FIG. 3A. In the first punching step, as shown in FIG. 6A, the first work W (W2) is placed on the bottom surface 48a of second mold cavity 48 in the fifth die 46 of third die set 45.

Since the second mold cavity 48 has the same shape as the first mold cavity 40, the first work W (W2) is positioned coaxial with the second mold cavity 48, and the axis Q (Q2) is set to be perpendicular to the bottom surface 48a.

The sixth die 47 is inserted into the second mold cavity 48 of fifth die 46 along the axis Q (Q2) and into the hole 50 in the first work W (W2). The sixth die 47 is then moved along the axis Q (Q2) so as to be inserted into the punching hole 49. The sixth die 47 punches and removes a part X of the first work W (W2), which constitutes the bottom of the hole 50. The first work W (W3) is thus formed, with the hole 50 penetrating the work W (W3).

Figure 10:
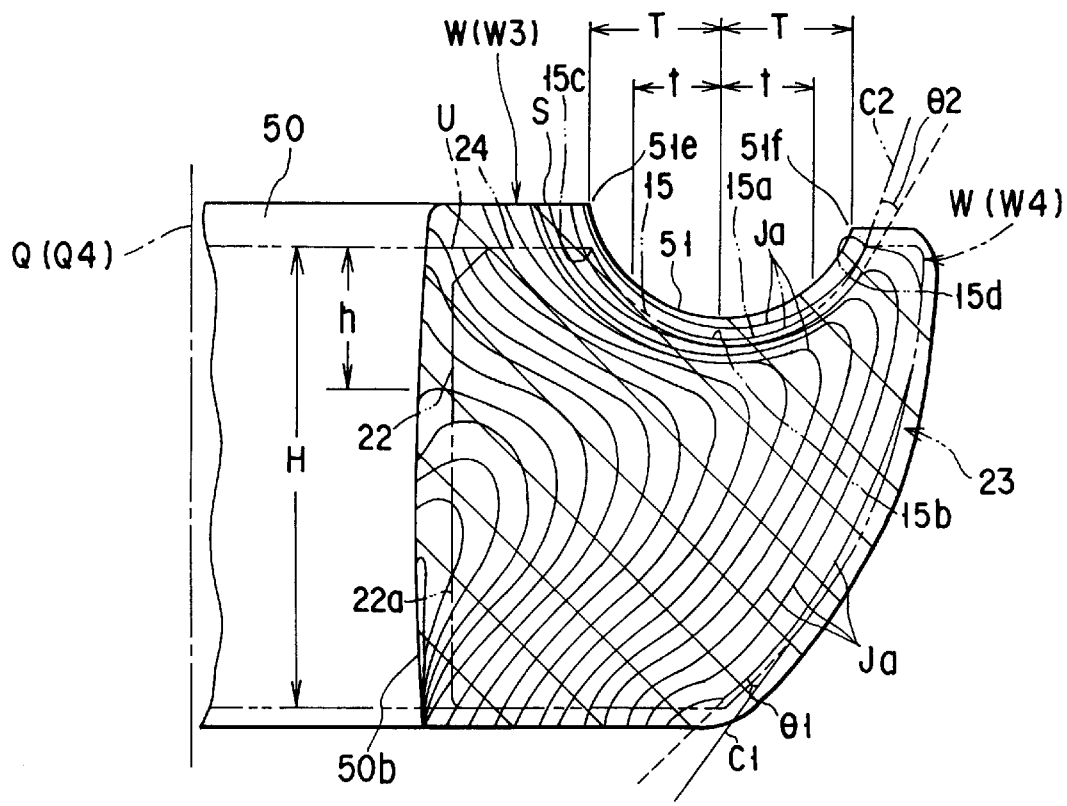
FIG. 10 is a cross sectional view showing a part of the first work after the first punching step illustrated in FIGS. 6A and 6B.

In step S5, the first work W (W3) is subjected to a cutting process, a heating process, etc., as described below, and the power roller 10 having a desired shape is obtained. At first, the first work W (W3) subjected to the first punching step, as shown in FIG. 10 by a solid line S, is subjected to a cutting process. The first work W (W4) is thus formed to have the shape of the power roller 10, as shown in FIG. 10 by a two-dot-and-dash line U.

Subsequently, the first work W (W4) is subjected to a desired heating process such as cementing or carbonitriding. Further, the entirety of the first work W (W4) is polished with a required precision, and the power roller 10 of the power roller bearing 11 is obtained.

The above-described outer race 13 of the power roller bearing 11 is manufactured through a second upsetting step, a second die forging step and a second punching step. These steps will now be described.

Figure 7A:
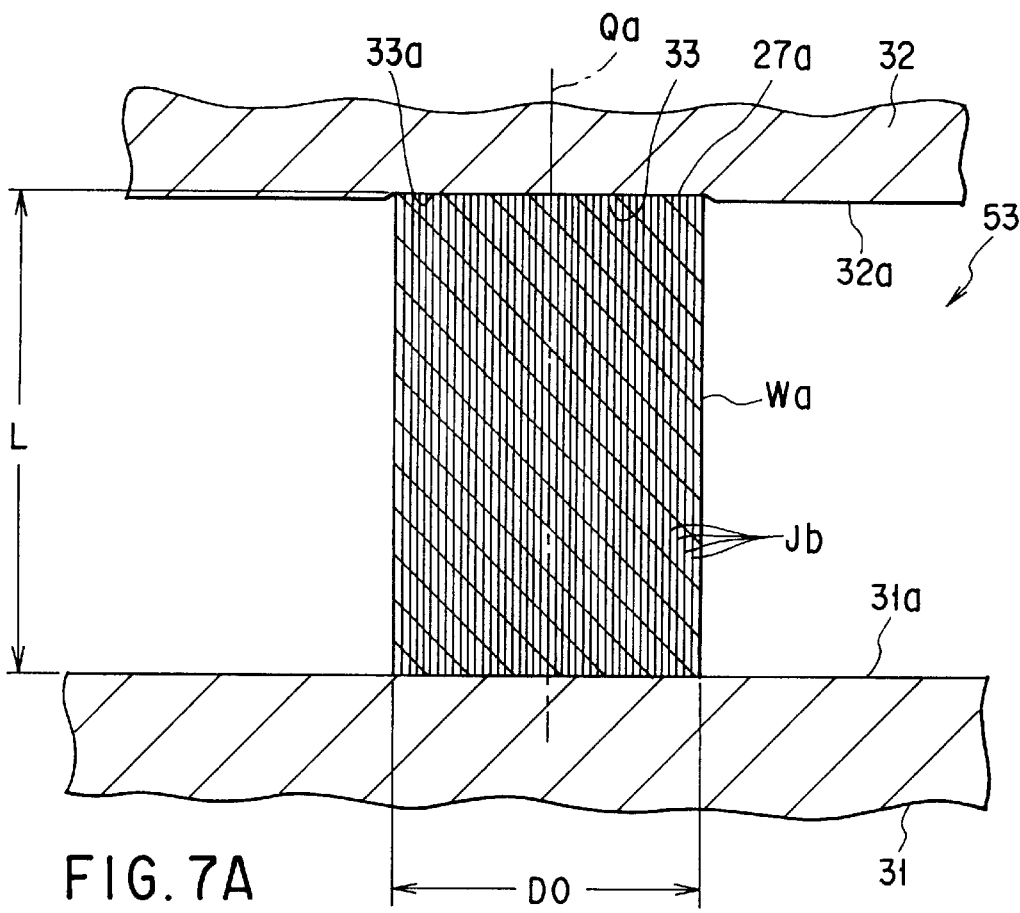
FIG. 7A is a cross-sectional view showing a second work and a fourth die set before a second upsetting step for manufacturing the outer race shown in FIG. 2B.
Figure 7B:
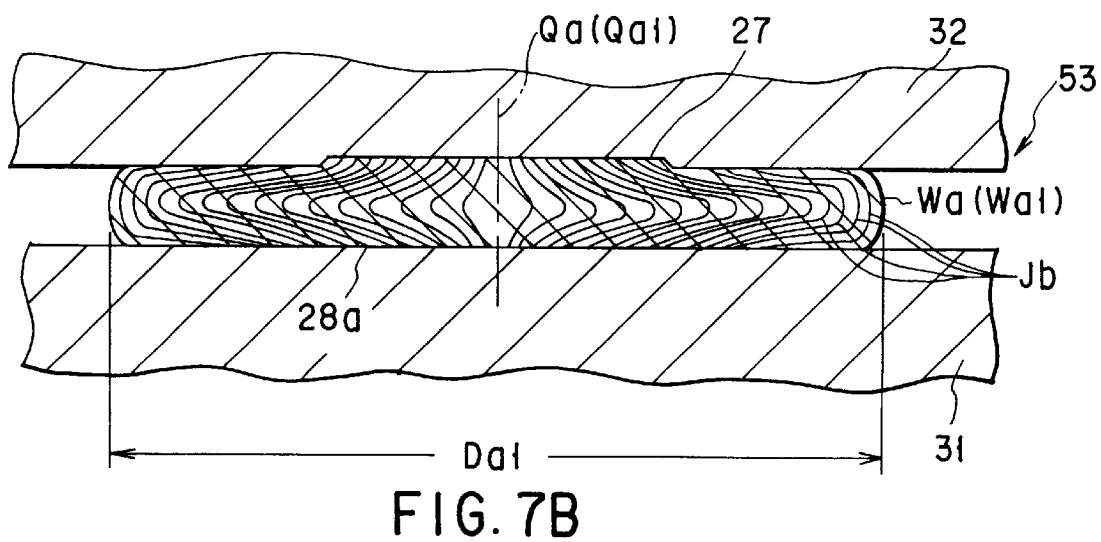
FIG. 7B is a cross-sectional view showing the second work and the fourth die set after the second upsetting step for manufacturing the outer race shown in FIG. 2B.
Figure 8A:
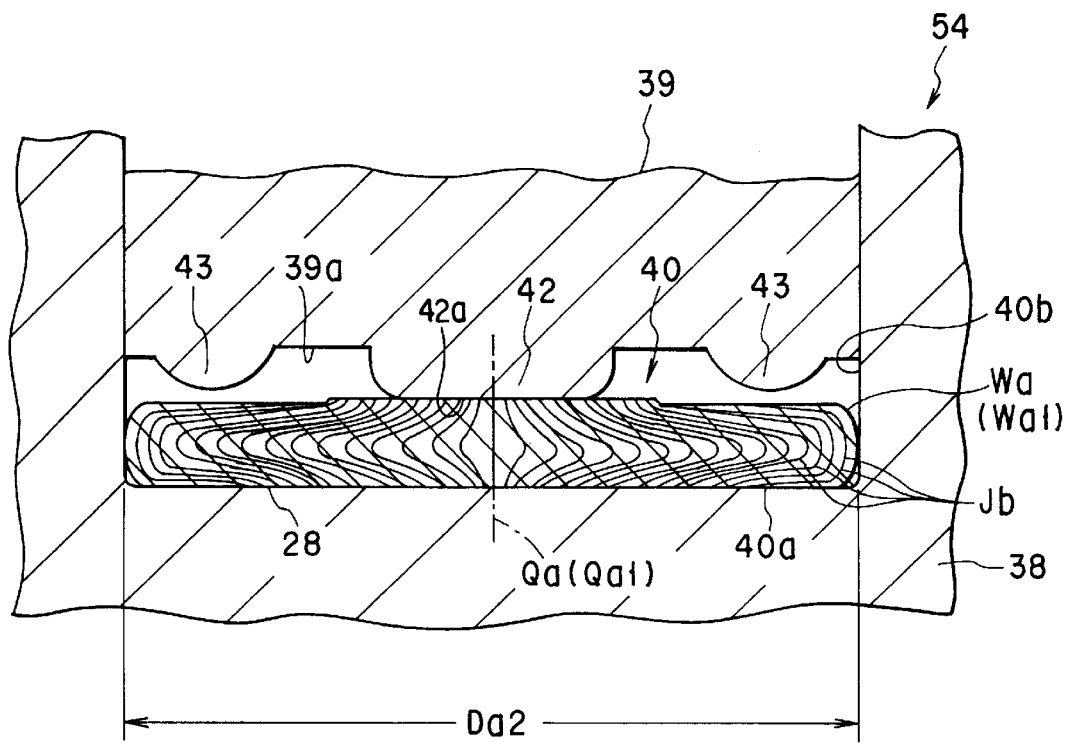
FIG. 8A is a cross-sectional view showing the second work and a fifth die set before a second die forging step for manufacturing the outer race shown in FIG. 2B.
Figure 8B:
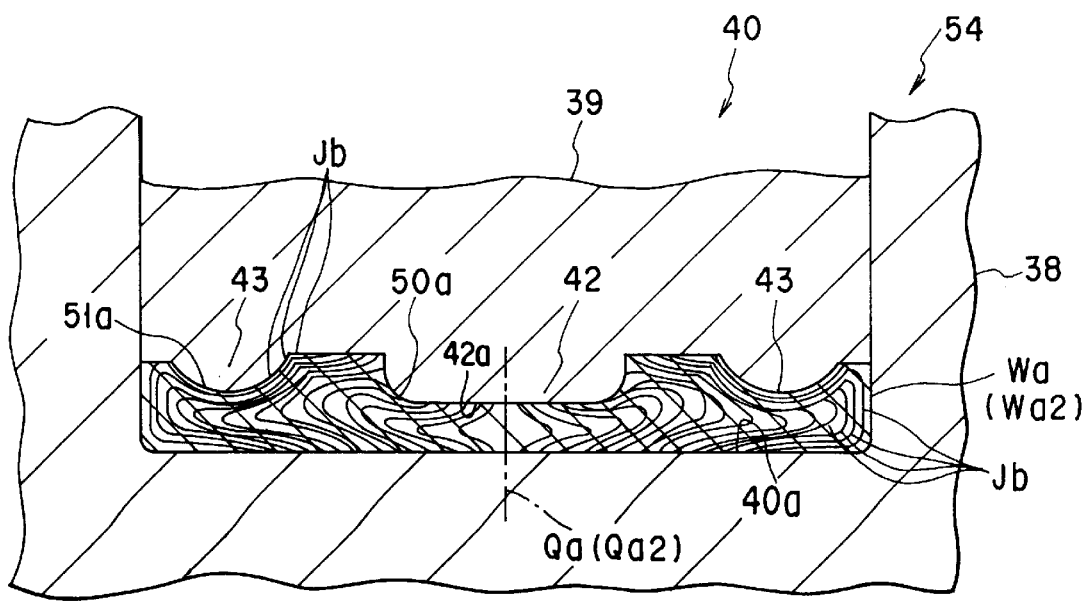
FIG. 8B is a cross-sectional view showing the second work and the fifth die set after the second die forging step for manufacturing the outer race shown in FIG. 2B.
Figure 9A:
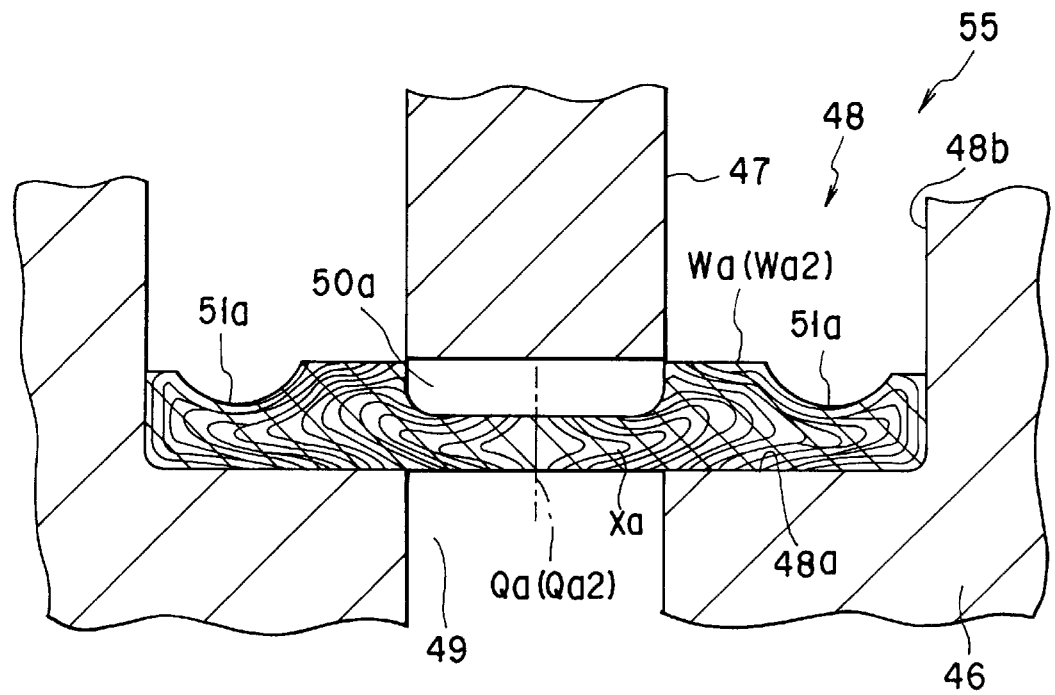
FIG. 9A is a cross-sectional view showing the second work and a sixth die set before a second punching step for manufacturing the outer race shown in FIG. 2B.
Figure 9B:
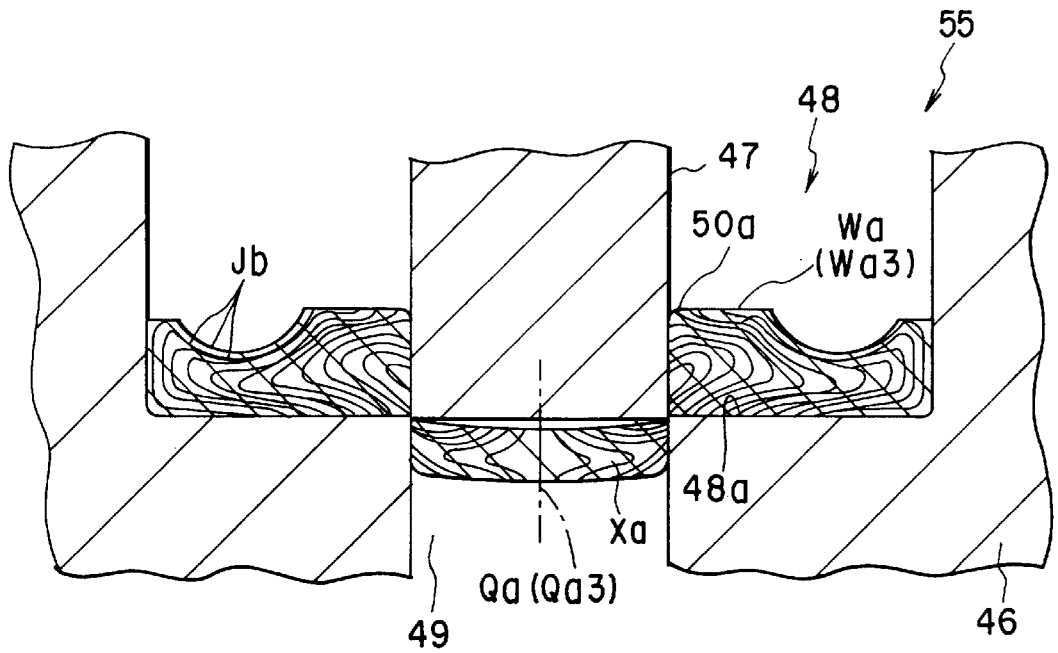
FIG. 9B is a cross-sectional view showing the second work and the sixth die set after the second punching step for manufacturing the outer race shown in FIG. 2B.

In the second upsetting step, a fourth die set 53 shown in FIGS. 7A and 7B is used. In the second forging step, a fifth die set 54 shown in FIGS. 8A and 8B is used. In the second punching step, a sixth die set 55 shown in FIGS. 9A and 9B is used. As regards the fourth die set 53, fifth die set 54 and sixth die set 55, the structural elements common to those of the die sets 30, 37 and 45 for forming the power roller 10 are denoted by like reference numerals and a description thereof is omitted.

Like the first work W, a rod-like metallic material Wa (hereinafter referred to as "second work") for forming the outer race 13 is produced through a rolling step, etc. The second work Wa is formed to be solid in a cylindrical shape, with its diameter being substantially constant along the axis Qa.

The second work Wa has a length L and an outside diameter D0 which meet the aforementioned equation (1). The second work Wa has a metal flow Jb extending along the axis Qa. The outside diameter D0 of the second work Wa is smaller than a diameter Db of the inner peripheral end 16c of the raceway groove 16 of the outer race 13 shown in FIG. 2B.

As is shown in FIGS. 7A and 7B, the fourth die set 53 used in the second upsetting step comprises a first die 31 and a second die 32. The second die 32 has a recessed portion 33 at its end face 32a.

As is shown in FIGS. 8A and 8B, the fifth die set 54 used in the second die forging step comprises a third die 38 and a fourth die 39. In the third die 38 used in the second die forging step, the first mold cavity 40 is not provided with the traction forming surface 41, as shown in FIGS. 8A and 8B. The inside diameter of the first mold cavity 40 is substantially constant down to the vicinity of the bottom face 40a. The first mold cavity 40 has a side wall 40b extending substantially perpendicular to the bottom face 40a along the axis Qa (Qa1) of the second work Wa (Wa1).

The central projection 42 of the fourth die 39 used in the second die forging step is formed to have a shape corresponding to the center hole 25 of the outer race 13. The diameter of the central projection 42 is slightly smaller than the inside diameter of the center hole 25. The peripheral projection 43 of the fourth die 39 used in the second die forging step is formed to have a shape corresponding to the raceway groove 16 of outer race 13.

The sixth die set 55 used in the second punching step comprises a fifth die 46 and a sixth die 47, as shown in FIGS. 9A and 9B. In the fifth die 46, the second mold cavity 48 has a same shape as the first mold cavity 40 of the fifth die set 54. The inside diameter of the second mold cavity 48 of the sixth die set 55 used in the second punching step is substantially constant down to the vicinity of the bottom face 48a. The second mold cavity 48 of the sixth die set 55 used in the second punching step has a side wall 48b extending substantially perpendicular to the bottom face 48a along the axis Qa (Qa2).

The process of manufacturing the above-described outer race 13 will now be described with reference to FIGS. 3B, 7A through 9B and 11.

In step Sa1 in FIG. 3B, the second work Wa is heated by a well-known heating device such as an electric furnace up to such a temperature for forging as to permit easy deformation. In step Sa2 in FIG. 3B, the second upsetting step is performed, as described below. In the second upsetting step, like the first upsetting step, as shown in FIGS. 7A and 7B, the second work Wa is pressed in the state in which the end face 27a is held. The second work Wa is formed in a disk-like shape, with the outside diameter being increased.

Accordingly, the metal flow Jb of the end face 27a does not spread radially outward after the pressing. On the other hand, the metal flow Jb of the region other than the end face 27a spreads radially outward along the outer shape of the second work Wa (Wa1) after the pressing.

It is preferable in the second upsetting step that the outside diameter Da1 of the second work Wa (Wa1) in FIG. 7B be equal to the diameter Da2 of the bottom face 40a of first mold cavity 40 shown in FIG. 8A.

The second die forging step is performed in step Sa3 in FIG. 3B. In the second die forging step, as shown in FIGS. 8A and 8B, the second work Wa (Wa1) is forged by using the fifth die set 54 as in the first die forging step.

The second work Wa (Wa1) is integrally provided with a hole 50a corresponding to the center hole 25, which is formed to match with the central projection 42, and a recess 51a corresponding to the raceway groove 16, which is formed to match with the peripheral projection 43. The hole 50a does not penetrate the second work Wa (Wa2).

No end of metal flow Jb occurs at the surface of the recess 51a of second work Wa (Wa2) which corresponds to the raceway groove 16 and is formed along the peripheral projection 43. The metal flow Jb extends along the recess 51a corresponding to the raceway groove 16.

The second punching step is performed in step Sa4 in FIG. 3B. In the second punching step, as shown in FIGS. 9A and 9B, the second work (Wa2) is punched by using the sixth die 55, as in the first punching step. In the second punching step, the sixth die 47 punches and removes a part Xa of the second work Wa (Wa2), which constitutes the bottom of the hole 50a. The second work Wa (Wa3) is thus formed, with the hole 50a penetrating the work Wa (Wa3).

Figure 11:
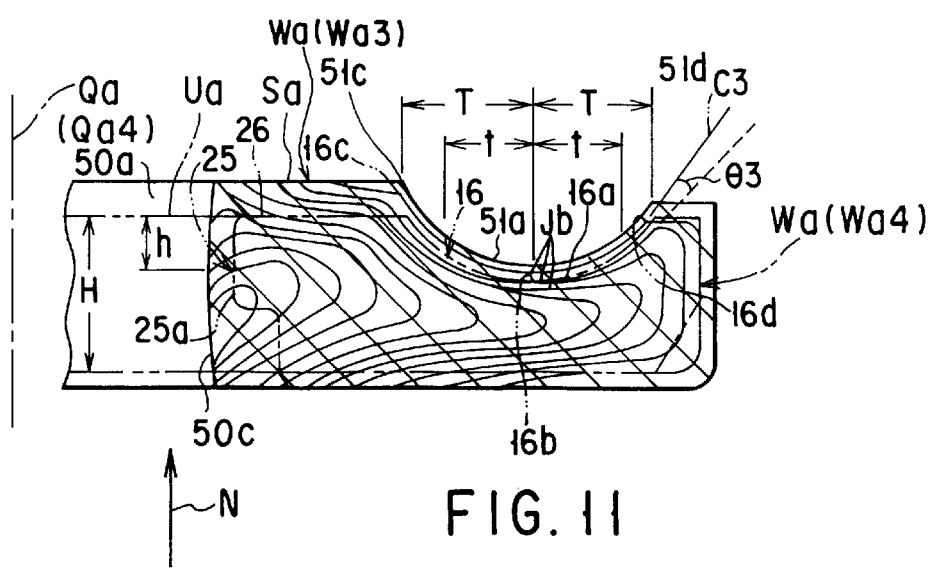
FIG. 11 is a cross sectional view showing a part of the second work after the second punching step illustrated in FIGS. 9A and 9B.
Figure 12A:
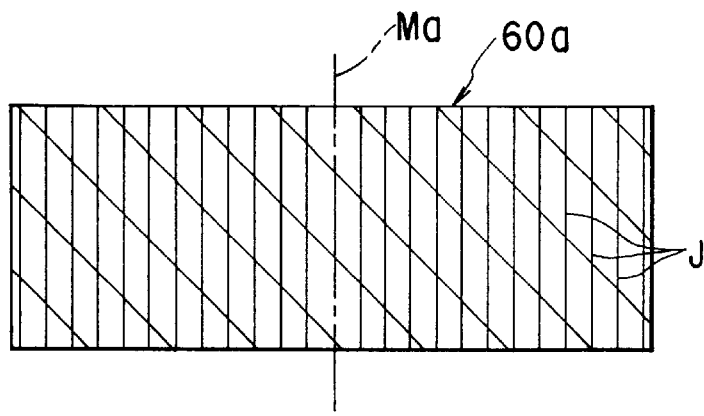
FIG. 12A is a cross-sectional view showing an example of a material for forming a power roller of a conventional half-toroidal type continuously variable transmission.
Figure 12B:
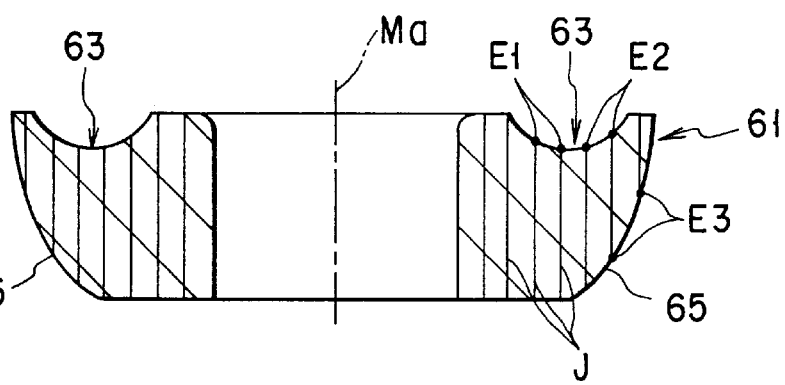
FIG. 12B is a cross-sectional view showing the power roller formed of the material shown in FIG. 12A.
Figure 13A:
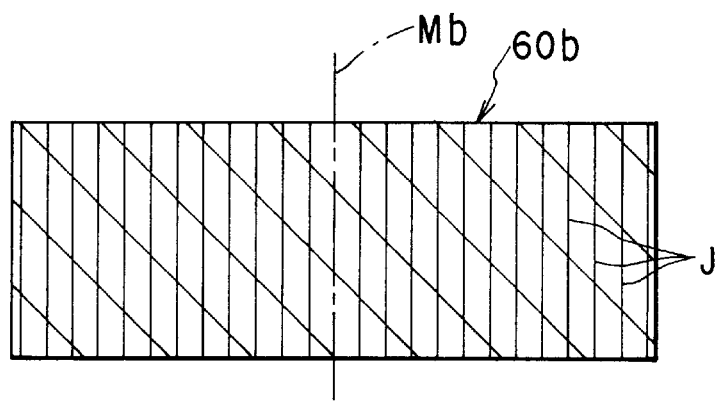
FIG. 13A is a cross-sectional view showing an example of a material for forming an outer race of a power roller bearing of a conventional half-toroidal type continuously variable transmission.
Figure 13B:
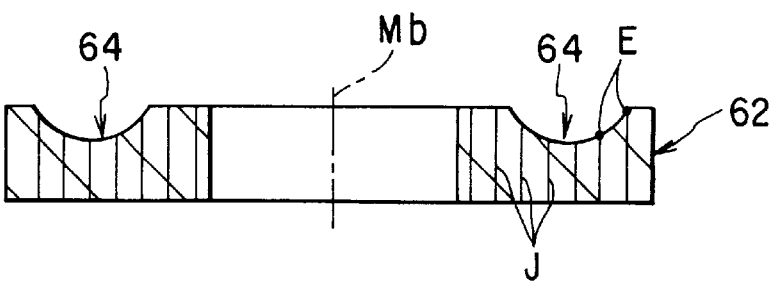
FIG. 13B is a cross-sectional view showing the outer race formed of the material shown in FIG. 13A.

In step Sa5, the second work Wa (Wa3) is subjected to a cutting process, a heating process, etc., as described below, and the outer race 13 having a desired shape is obtained. At first, the second work Wa (Wa3) subjected to the second punching step, as shown in FIG. 11 by a solid line Sa, is subjected to a cutting process. The second work Wa (Wa4) is thus formed to have the shape of the outer race 13, as shown in FIG. 11 by a two-dot-and-dash line Ua.

Subsequently, the second work Wa (Wa4) is subjected to a desired heating process such as cementing or carbonitriding. Further, the entirety of the second work Wa (Wa4) is polished with a required precision, and the outer race 13 of the power roller bearing 11 is obtained.

According to the methods of manufacturing the power roller 10 and outer race 13 of the half-toroidal type continuously variable transmission of the present embodiment, the works W, Wa are cylindrical bodies having outside diameters Da, Db which are less than the inside diameters Da, Db of the inner peripheral end 15c, 16c of the raceway grooves 15, 16. In the first and second upsetting steps, the works W, Wa are pressed with their end face 27, 27a being held. Thus, the metal flows Ja, Jb extend along the recesses 51, 51a corresponding to the raceway grooves 15, 16.

Accordingly, as is shown in FIG. 10, an angle θ2 between the metal flow Ja and a tangent line C2 of the surface 15a of the raceway groove 15 is 30 degrees or less. The metal flow Ja is formed along the surface 15a.

As is shown in FIG. 11, an angle θ3 between the metal flow Jb and tangent line C3 of the surface 16a of the raceway groove 16 is 30 degrees or less. The metal flow Jb is formed along the surface 16a.

Therefore, an end of metal flow does not easily occur at the surface 15a, 16a of the raceway groove 15, 16 of each of the power roller 10 and outer race 13. Even if a very great stress acts on the raceway grooves 15, 16 while the power roller bearing 11 is used, the power roller 10 and outer race 13 are prevented from being destroyed at the surface 15a, 16a. Therefore, the life of the power roller bearing 11 can be elongated.

The third die 38 of second die set 37 used in the first die forging step has the traction forming surface 41 corresponding in shape to the traction surface 23 of power roller 10. Thus, the curved face 44 corresponding to the traction surface 23 is formed at the outer periphery of the work W, and the metal flow Ja forms along the curved face 44.

Accordingly, as is shown in FIG. 10, an angle θ1 between the metal flow Ja and a tangent line C1 of the traction surface 23 is 30 degrees or less. The metal flow Jb is formed angle the traction surface 23. Therefore, an end of metal flow does not easily occur at the traction surface 23. Moreover, so-called flaking, by which part of traction surface 23 is exfoliated, does not easily occur. Therefore, the life of the power roller bearing 11 can be elongated.

Since the cutting process, etc. are performed, small flaws caused on the works W, Wa in the upsetting step, die forging step and punching step can be exactly eliminated. Therefore, the life of the power roller 10 and outer race 13 is prevented from decreasing due to flaws caused in these steps.

Accordingly, the life of the power roller 10 and outer race 13 can be increased, and the life of the half-toroidal type continuously variable transmission including the power roller 10 and outer race 13 can be increased.

It is desirable that the dies 30, 37 and 45 be formed so that no end of metal flow may occur at the inner peripheral surface 50b of the hole 50 in the first work W (W3) formed through the first upsetting step, first forging step and first punching step, in the range of a distance h from the end face 24 of the finished power roller 10, the distance h being less than 30% of thickness H of the finished power roller 10.

The above is clear from the results of endurance tests as shown in TABLE 1 below. In the endurance tests, the results of which are shown in TABLE 1, works W (W3) were prepared through the first upsetting step, first forging step and first punching step. Power rollers 10 formed of the works W (W3) were used as samples A to H. The works W (W3) were formed by using the die sets 30, 37 and 45 having different structures, and they have different h/H ratios of the distance h to thickness H.

In the endurance tests, the samples A to H were incorporated in the power roller bearing 11, the input torque was set at 340 N·m, the number of revolutions of the input disk 2 was set at 4000 rpm, and the power roller 10 was set in a maximum deceleration state.

TABLE 1

Results of endurance tests of power rollers having different positions of the end of metal flow

| Sample No. | h/H (%) | Test Results | Judgement |
| --- | --- | --- | --- |
| Sample A | 0.0 | Destroyed after 96 hours | X |
| Sample B | 12.8 | Destroyed after 164 hours | X |
| Sample C | 22.4 | Destroyed after 158 hours | X |
| Sample D | 28.4 | Destroyed after 232 hours | X |
| Sample E | 32.8 | No destruction after 250 hours | |
| Sample F | 40.0 | No destruction after 250 hours | |
| Sample G | 50.0 | No destruction after 250 hours | |
| Sample H | 67.2 | No destruction after 250 hours | |

According to the test results in TABLE 1, it turned out that in the case of samples E to H, which were formed of the works W (W3) having h/H ratios of 30% or more, the power rollers 10 were not destroyed even if the endurance tests were conducted over 250 hours.

It also turned out that the power rollers 10, such as samples A to D, which were formed of the works W (W3) having the end of metal flow on the inner peripheral surface 50b of the hole 50 near the end face 24, where the raceway groove 16 is formed, were destroyed in a relatively short time period.

It was thus clarified that the power roller 10 with a relatively long life can be obtained by forming the work W (W3) for forming the power roller 10 such that the end of metal flow does not occur in the range of less than 30% of the h/H ratio on the inner peripheral surface 50b of the hole 50.

Like the power roller 10, the outer race 13 with a relatively long life can be obtained by forming the work Wa (Wa3) for forming the outer race 13 such that the end of metal flow does not occur on the inner peripheral surface 50c of the hole 50a in the range of less than 30% of the h/H ratio of distance h from the end face 26 to thickness H of the finished outer race 13.

It is desirable that the dies 53, 54 and 55 be formed so that no end of metal flow may occur at the surface of the recess 51a corresponding to the raceway groove 16 of the second work Wa (Wa3) formed through the second upsetting step, second forging step and second punching step, in the range of less than 70% of the width of the raceway groove 16 near the center of the groove 16, when the work Wa is formed into the finished outer race 13.

This is clear from the results of endurance tests shown in TABLE 2 below. In the endurance tests, the results of which are shown in TABLE 2, works Wa (Wa3) were prepared through the second upsetting step, second forging step and second punching step. Outer races 13 formed of the works Wa (Wa3) were used as samples A to K.

The works Wa (Wa3) were formed by using the die sets 53, 54 and 55 having different structures. The works Wa (Wa3), of which samples A to K were formed, have different t/T ratios, wherein t (shown in FIG. 11) is a distance between the end of metal flow located closest to the center of the raceway groove 16 (obtained when the work Wa is formed into the outer race 13) on the surface of the recess 51a corresponding to the raceway groove 16 and the bottom 16b at the center of the raceway groove 16, and T is a distance between the bottom 16b at the center of the raceway groove 16 and an end 51c corresponding to an inner peripheral end 16c or an end 51d corresponding to an outer peripheral end 16d of the raceway groove 16.

In the endurance tests, the samples A to K were incorporated in the power roller bearing 11, and a load of 160 kgf was applied to samples A to K in the thrust direction of arrow N and axis Qa in FIG. 11.

TABLE 2

Results of endurance tests of outer races having different positions of the end of metal flow

| Sample No. | t/T (%) | Test Results | Judgement |
| --- | --- | --- | --- |
| Sample A | 100.0 | No destruction after 500 hours | |
| Sample B | 82.0 | No destruction after 500 hours | |
| Sample C | 78.0 | No destruction after 500 hours | |
| Sample D | 72.7 | No destruction after 500 hours | |
| Sample E | 64.7 | Surface exfoliation of raceway groove after 407 hours | X |
| Sample F | 56.7 | Surface exfoliation of raceway groove after 352 hours | X |
| Sample G | 54.7 | Surface exfoliation of raceway groove after 362 hours | X |
| Sample H | 28.0 | Surface exfoliation of raceway groove after 152 hours | X |
| Sample I | 26.0 | Surface exfoliation of raceway groove after 98 hours | X |
| Sample J | 30.0 | Surface exfoliation of raceway groove after 123 hours | X |

TABLE 2-continued

Results of endurance tests of outer races having
different positions of the end of metal flow

| Sample No. | t/T (%) | Test Results | Judgement |
|---|---|---|---|
| Sample K | 0.0 | exfoliation of raceway groove after 59 hours | X |

According to the test results in TABLE 2, it turned out that in the case of samples A to D, which were formed of the works Wa (Wa3) having t/T ratios of 70% or more, the outer races 13 were not destroyed even if the endurance tests were conducted over 500 hours.

It also turned out that the outer races 13, such as samples E to K, which were formed of works Wa (Wa3) having the t/T ratio of less than 70% and the end of metal flow near the center of the recess 51a, were destroyed in a relatively short time period. For example, the surface of the raceway groove 15 was exfoliated.

It was thus clarified that the outer race 13 with a relatively long life can be obtained by preparing the work Wa (Wa3) for forming the outer race 13 such that no end of metal flow occurs at the surface of the recess 51a in the range of less 70% of the width of the raceway groove 16 near the center of the raceway groove 16 of outer race 13.

Like the outer race 13, the power roller 10 with a relatively long life can be obtained by preparing the work W (W3) for forming the power roller 10 such that no end of metal flow may occur at the recess 51 corresponding to the raceway groove 15 in the range of the less than 70% of t/T ratio, wherein t is a distance between the end of metal flow located closest to the center of the raceway groove 15 on the surface of the recess 51 corresponding to the raceway groove 15 and the bottom 15b at the center of the raceway groove 15, and T is a distance between the bottom 15b at the center of the raceway groove 15 and an end 51e corresponding to an inner peripheral end 15c or an end 51f corresponding to an outer peripheral end 15d of the raceway groove 15.

As has been described above, according to the methods of manufacturing the power roller 10 and outer race 13 of the power roller bearing 11 of the half-toroidal continuously variable transmission 20 of this invention, the metal flows Ja, Jb are formed along the surfaces of the raceway grooves 15 and 16. Thus, the end of metal flow does not easily occur at the raceway grooves 15 and 16, and the power roller 10 and outer race 13 with a relatively long life can be obtained.

The metal flow Ja is formed along the traction surface 23 of power roller 10. Thus, the end of metal flow does not easily occur at the traction surface 23 and the power roller 10 with a longer life can be obtained.

The power roller 10 with a longer life can be obtained by preventing formation of the end of metal flow on the inner peripheral surface 50b of the hole 50 of first work W (W3) at a position where the h/H ratio is less than 30%.

The outer race 13 with a longer life can be obtained by preventing formation of the end of metal flow in the recess 51 of second work Wa (Wa3) at a position where the t/T ratio is less than 70%.

According to the methods of the present invention, the power roller 10 and outer race 13 are formed through the first and second upsetting steps, first and second forging steps, and first and second punching steps. Thus, compared to the methods of manufacture by means of cutting and processing alone, the yield of materials can be increased, the time needed for processing shortened, and the increase in manufacturing cost prevented.

According to the methods of the present invention, a power roller 10 and a outer race 13 as described below are obtained. In the power roller 10, an end of the metal flow Ja is absent at a position on the surface 15a of the raceway groove 15, where a ratio t/T of a distance t from a bottom 15b of the raceway groove 15 to a distance T between the bottom 15b and one of an inner peripheral end 15c and an outer peripheral end 15d of the raceway groove 15 is less than 70%.

In the power roller 10, an end of a metal flow Ja is absent at a position on an inner peripheral surface 22a defining the center hole 22, where a ratio h/H of a distance h from the end face 24 to a thickness H of the power roller 10 is less than 30%.

According to the test results in TABLE 1, a life of the power roller 10 can be elongated, and a life of half-toroidal type continuously variable transmission 20 including the power roller 10 can be elongated.

In the outer race 13, an end of the metal flow Jb is absent at a position on the surface 16a of the raceway groove 16, where a ratio t/T of a distance t from a bottom 16b of the raceway groove 16 to a distance T between the bottom 16b and one of an inner peripheral end 16c and an outer peripheral end 16d of the raceway groove 16 is less than 70%.

In the outer race 13, and end of a metal flow Jb is absent at a position on an inner peripheral surface 25a defining the center hole 25, where a ratio h/H of a distance h from the end face 26 to a thickness H of the outer race 13 is less than 30%.

According to the test results in TABLE 2, a life of the outer race 13 can be elongated, and a life of half-toroidal type continuously variable transmission 20 including the outer race 13 can be elongated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power roller bearing in a toroidal type continuously variable transmission for transmitting power due to rotation of an input disk to an output disk, the power roller bearing being provided swingably between the input disk and the output disk, the power roller bearing comprising:

an inner race; and an outer race;

wherein the inner race is formed in an annular shape that includes a traction surface put in contact with both the input disk and the output disk, an end face opposed to the outer race, and an annular raceway groove of the inner race provided at the end face, and a metal flow extending along at least one of the traction surface and a surface of the raceway groove of the inner race, and wherein an angle between the metal flow of the inner race and a tangent line to at least one of the traction surfaces and the surface of the raceway groove of the inner race is 30° or less, and the outer race is formed in an annular shape and includes an end face opposed to the inner race and an annular raceway groove of the outer race provided at the end face, and a metal flow extending along a surface of the raceway groove of the outer race, wherein an angle between the metal flow of the outer race and a tangent line to the surface of the raceway groove of the outer race is 30° or less.

2. The power roller bearing in the toroidal type continuously variable transmission according to claim 1, wherein on at least one of the surfaces of the raceway groove of the inner race and the raceway groove of the outer race, an end of the metal flow is absent at a position where a ratio t/T of a distance t from a center line pass through bottom of the raceway groove and parallel to axis of the outer race and the inner race and a distance T between the center line pass through the bottom and one of an inner peripheral end and an outer peripheral end of the raceway groove is less than 70%.

3. A power roller bearing in a toroidal type continuously variable transmission for transmitting power due to rotation of an input disk to an output disk, the power roller bearing being provided swingably between the input disk and the output disk, the power roller bearing comprising:

an inner race; and an outer race, wherein the inner race is formed in an annular shape and includes a center through hole provided at a central portion thereof, and an end face opposed to the outer race, and the outer race is formed in an annular shape and includes a center through hole provided at a central portion thereof, and an end face opposed to the inner race, wherein on an inner peripheral surface defining at least one of the center holes of the inner race and the outer race, an end of a metal flow is absent at a position where a ratio h/H of a distance h from the end face to a thickness H of an associated one of the inner race and the outer race is less than 30%.

4. A method of manufacturing a power roller bearing in a toroidal type continuously variable transmission including an inner race and an outer race, wherein the inner race and the outer race have annular shapes and include mutually opposed end faces, raceway grooves provided at the end faces, center holes provided at central portions thereof, and metal flows extending along the raceway grooves and traction surface of the inner race, wherein at least one of the inner race and the outer race is formed by using as a material a cylindrical work having a metal flow extending along an axis, and is manufactured through:

an upsetting step for pressing the work along the axis, a forging step for forging the upset work, thereby forming a recess corresponding to the raceway groove and a hole having a bottom and corresponding to said center hole, and a punching step for punching the forged work, thereby removing a part of the work constituting the bottom of the hole;

in the upsetting step, which the work is pressed, a first die set is used, the first die set comprising:

a first die having an end face extending perpendicular to the axis of the work, and a second die having an end face extending perpendicular to the axis of the work;

in the forging step, when the upset work is forged, a second die set is used, the second die set comprising:

a third die having a first mold cavity with an inside diameter greater than an outside diameter of the work, and a fourth die formed cylindrical with an outside diameter substantially equal to the inside diameter of the first mold cavity, and having an end face extending perpendicular to the axis of the work, a central projection projecting from the end face toward the work and having a diameter smaller than an inside diameter of the center hole, and a peripheral projection projecting from the end face toward the work and formed annularly along the raceway groove with an arcuated cross section; and in the punching step, when the forged work is punched, a third die set is used, the third die set comprising:

a fifth die having an inside diameter equal to an outside diameter of the work, a second mold cavity with a bottom surface, and a punching hole extending along the axis of the work, opening at the bottom surface, and having an inside diameter slightly less than an inside diameter of the center hole, and a sixth die formed cylindrical and having an end face extending perpendicular to the axis of the work and an outside diameter slightly less than the inside diameter of the center hole.

5. The method of manufacturing the power roller bearing in the toroidal type continuously variable transmission according to claim 4, wherein the work used as the material has a ratio of its length L to its outside diameter D0, which meets the following relationship:

$$L/D0 \leq 2.2.$$

6. The method of manufacturing the power roller bearing in the toroidal type continuously variable transmission according to claim 4, wherein the first die set has, at least at one of the end face of the first die and the end face of the second die, a recessed portion having a diameter greater than an outside diameter of the work and less than a diameter of one of inner peripheral ends of the raceway groove, the recessed portion being recessed from the end face.

7. The method of manufacturing the power roller bearing in the toroidal type continuously variable transmission according to claim 4, wherein in the second die set for forging the work used as the material of the inner race, the first mold cavity of the third die includes a bottom face extending perpendicular to the axis of the work, and a traction forming surface formed to match with a traction surface.

* * * * *

UNITED STATES PATENT AND TRADEMARK OFFICE
CERTIFICATE OF CORRECTION

PATENT NO. : 6,196,946 B1
DATED : March 6, 2001
INVENTOR(S) : H. Sawai et al.

It is certified that error appears in the above-identified patent and that said Letters Patent is hereby corrected as shown below:

Column 19, claim 2,
Line 9, "pass through bottom" should read -- passed through the bottom --
Line 10, "parallel to axis" should read -- parallel to the axis --

Column 19, claim 4,
Line 58, "step, which" should read -- step, in which --

Colum 20, claim 5,
Line 37, "D0" should read -- D0 --

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*